(12) United States Patent
Alexander et al.

(10) Patent No.: US 8,250,404 B2
(45) Date of Patent: Aug. 21, 2012

(54) PROCESS INTEGRITY OF WORK ITEMS IN A MULTIPLE PROCESSOR SYSTEM

(75) Inventors: Benjamin G. Alexander, Austin, TX (US); Gregory H. Bellows, Austin, TX (US); Joaquin Madruga, Austin, TX (US); Barry L. Minor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/651,188

(22) Filed: Dec. 31, 2009

(65) Prior Publication Data

US 2011/0161734 A1    Jun. 30, 2011

(51) Int. Cl.
*G06F 11/00* (2006.01)
*G06F 11/14* (2006.01)

(52) U.S. Cl. ............. 714/13; 714/10; 714/15; 714/38.1
(58) Field of Classification Search .............. 714/10, 714/13, 15, 16, 31, 38.13, 38.1
See application file for complete search history.

(56) References Cited

U.S. PATENT DOCUMENTS

| | | | |
|---|---|---|---|
| 6,622,260 B1 | 9/2003 | Marisetty | |
| 7,017,075 B1 | 3/2006 | Peters | |
| 7,275,180 B2 | 9/2007 | Armstrong | |
| 7,627,782 B2 * | 12/2009 | Kitajima | 714/13 |
| 7,664,985 B2 * | 2/2010 | Ertel et al. | 714/15 |
| 7,707,451 B2 * | 4/2010 | Buskens et al. | 714/2 |
| 7,802,128 B2 * | 9/2010 | Dasari et al. | 714/4.1 |
| 2007/0005936 A1 * | 1/2007 | Ortega | 712/1 |
| 2007/0101324 A1 * | 5/2007 | Lupu et al. | 718/1 |
| 2008/0288502 A1 | 11/2008 | Coley et al. | |

OTHER PUBLICATIONS

International Search Report & Written Opinion; Application No. PCT/EP2010/068929; published Dec. 6, 2010.
Yawei Li et al: "Fault-Driven Re-Scheduling for Improving System-level Fault Resilience", Parallel Processing, 2007. ICPP 2007. International Conference on, IEEE, Piscataway, NJ, USA, Sep. 1, 2007, p. 39, XP031142716, ISBN: 978-0-7695-2933-2 the whole document.

(Continued)

*Primary Examiner* — Joseph Schell
(74) *Attorney, Agent, or Firm* — Yudell Isidore Ng Russell, PLLC

(57) ABSTRACT

Disclosed are a method, a system and a computer program product of operating a data processing system that can include or be coupled to multiple processor cores. In one or more embodiments, an error can be determined while two or more processor cores are processing a first group of two or more work items, and the error can be signaled to an application. The application can determine a state of progress of processing the two or more work items and at least one dependency from the state of progress. In one or more embodiments, a second group of two or more work items that are scheduled for processing can be unscheduled, in response to determining the error. In one or more embodiments, the application can process at least one work item that caused the error, and the second group of two or more work items can be rescheduled for processing.

23 Claims, 8 Drawing Sheets

OTHER PUBLICATIONS

Figure 1:
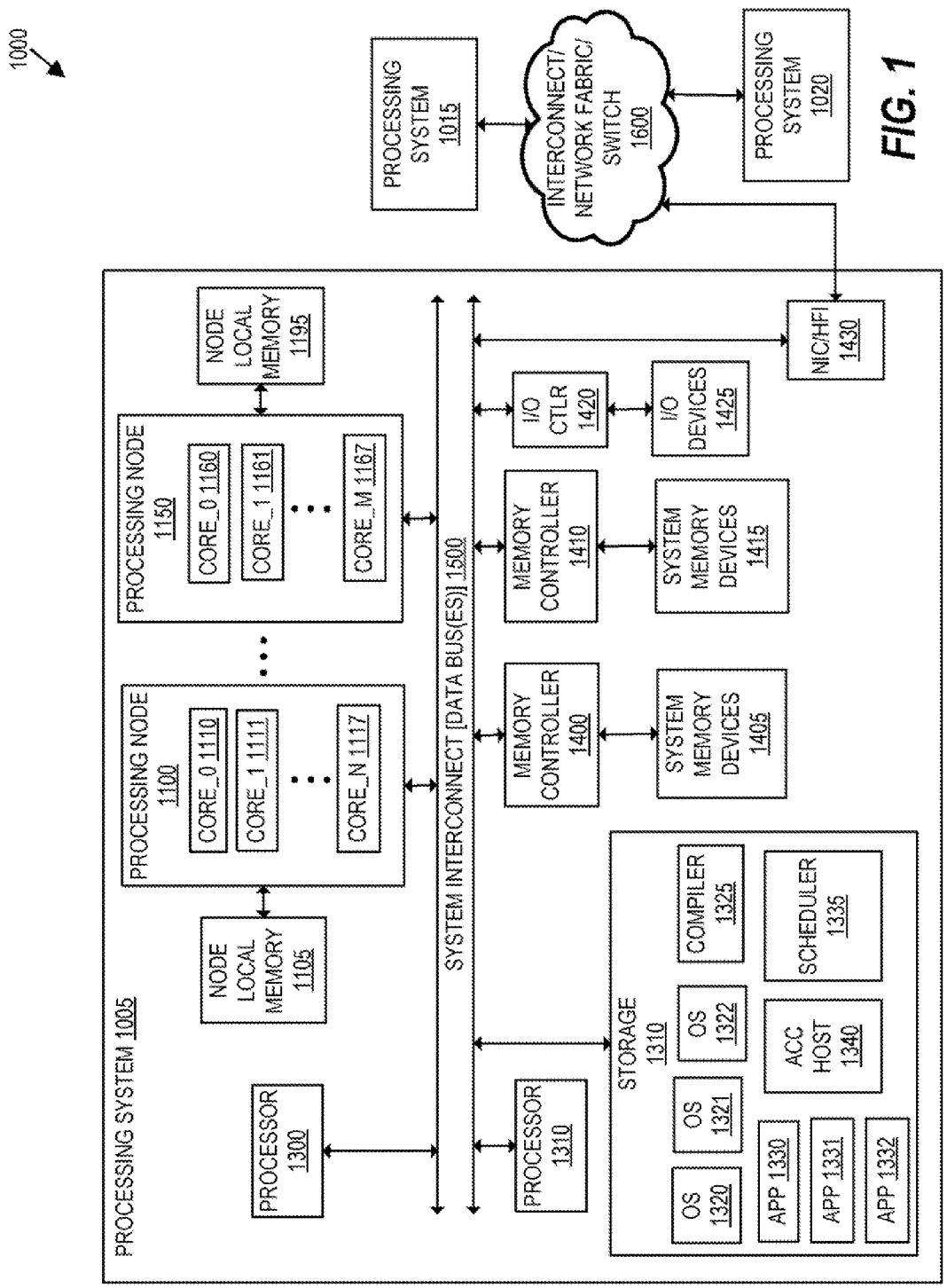

Lu Yang et al: "A Case Study for Fault Tolerance Oriented Programming in Multi-core Architecture", High Performance Computing and Communications, 2009. HPCC '09. 11th IEEE International Conference on, IEEE, Piscataway, NJ, USA, Jun. 25, 2009, pp. 630-635, XP031491456, ISBN: 978-1-4244-4600-1 *abstract paragraph [2.3.1].

Pengliu Tan: "Task Scheduling of Real-Time Systems on Multi-Core Architectures", Electronic Commerce and Security, 2009. ISECS '09. Second International Symposium on, IEEE, Piscataway, NJ, USA, May 22, 2009, pp. 190-193, XP031536615, ISBN: 978-0-7695-3643-9 the whole document.

Christian El Salloum et al: "Recovery Mechanisms for Dual Core Architectures", Defect and Fault Tolerance in VLSI Systems, 2006. DFT '06. 21st I EEE International Symposium on, IEEE, Pl, Oct. 1, 2006, pp. 280-288, XP031036872, ISBN: 978-0-7695-2706-2 the whole document.

* cited by examiner

PROCESS INTEGRITY OF WORK ITEMS IN A MULTIPLE PROCESSOR SYSTEM

BACKGROUND

1. Technical Field

The present invention generally relates to multi-processor data processing systems and in particular to operations on data processing systems configured with multiple processing units. Still more particularly, the present invention relates to a method and system of recovering from a failure in parallel processing of distributed work across multiple processing units of a multi-core data processing system.

2. Description of the Related Art

Multi-core data processing systems are widely utilized to enable parallel processing of data that can be divided into portions for completion. There are various different topologies of multi-core systems, of which non-uniform memory access (NUMA) system topology is one example. Moreover, an asynchronous failure in an accelerated workload (i.e., a work load processed by multiple processor cores), using threads, is catastrophic to an application, and such failures prevent the application from recovering. In the past, using a process based solution complicates the memory model used between cooperating accelerators making communication and recovery more difficult.

BRIEF SUMMARY

Disclosed are a method, a system and a computer program product of operating a data processing system that can include or be coupled to multiple processor cores, according to one or more embodiments. In one or more embodiments, an error can be determined while two or more processor cores are processing respective two more work items of a first group of two or more work items, and the error can be signaled to an application. The application can determine a state of progress of processing the two or more work items and at least one dependency from the state of progress. In one or more embodiments, a second group of two or more work items that are scheduled for processing can be unscheduled, in response to determining the error. In one example, an acceleration host can use a scheduler to unschedule the second group of two or more work items that are scheduled for processing. In one or more embodiments, at least one work item can be determined to have caused the error based on the state of progress. The application can process the at least one work item that caused the error or data that includes the at least one work item that caused the error, and the second group of two or more work items can be rescheduled for processing. In one or more embodiments, the second group of two or more work items can be dependent on a result from the at least one work item that caused the error and/or share a memory object, with the at least one work item that caused the error, that is not a read-only memory object. In one or more embodiments, the second group of two or more work items can be dependent on one or more from the first group of two or more work items and/or share a memory object, with the first group of two or more work items, that is not a read-only memory object.

The above summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE OF THE SEVERAL VIEWS OF THE DRAWINGS

Figure 2:
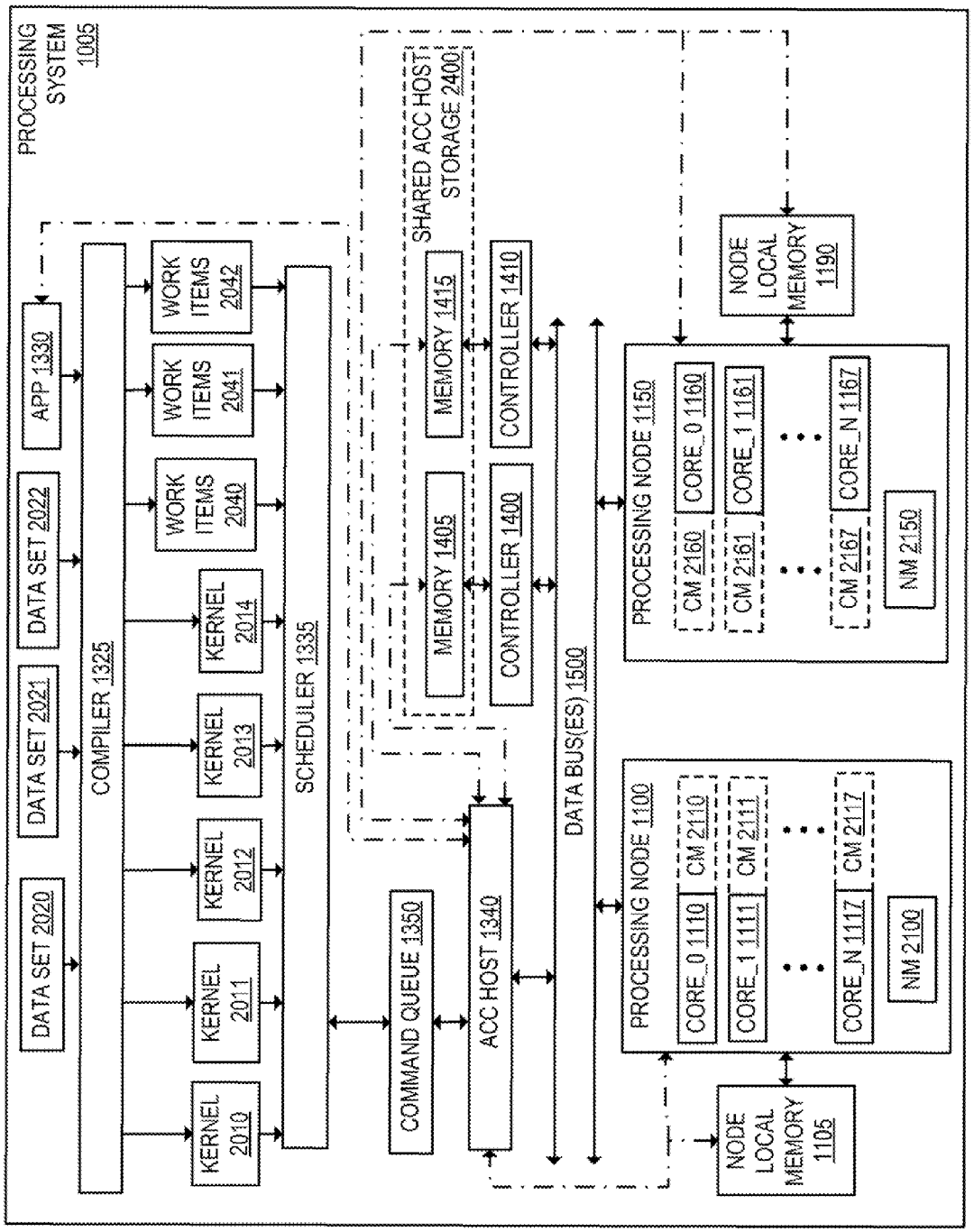
Figure 3:
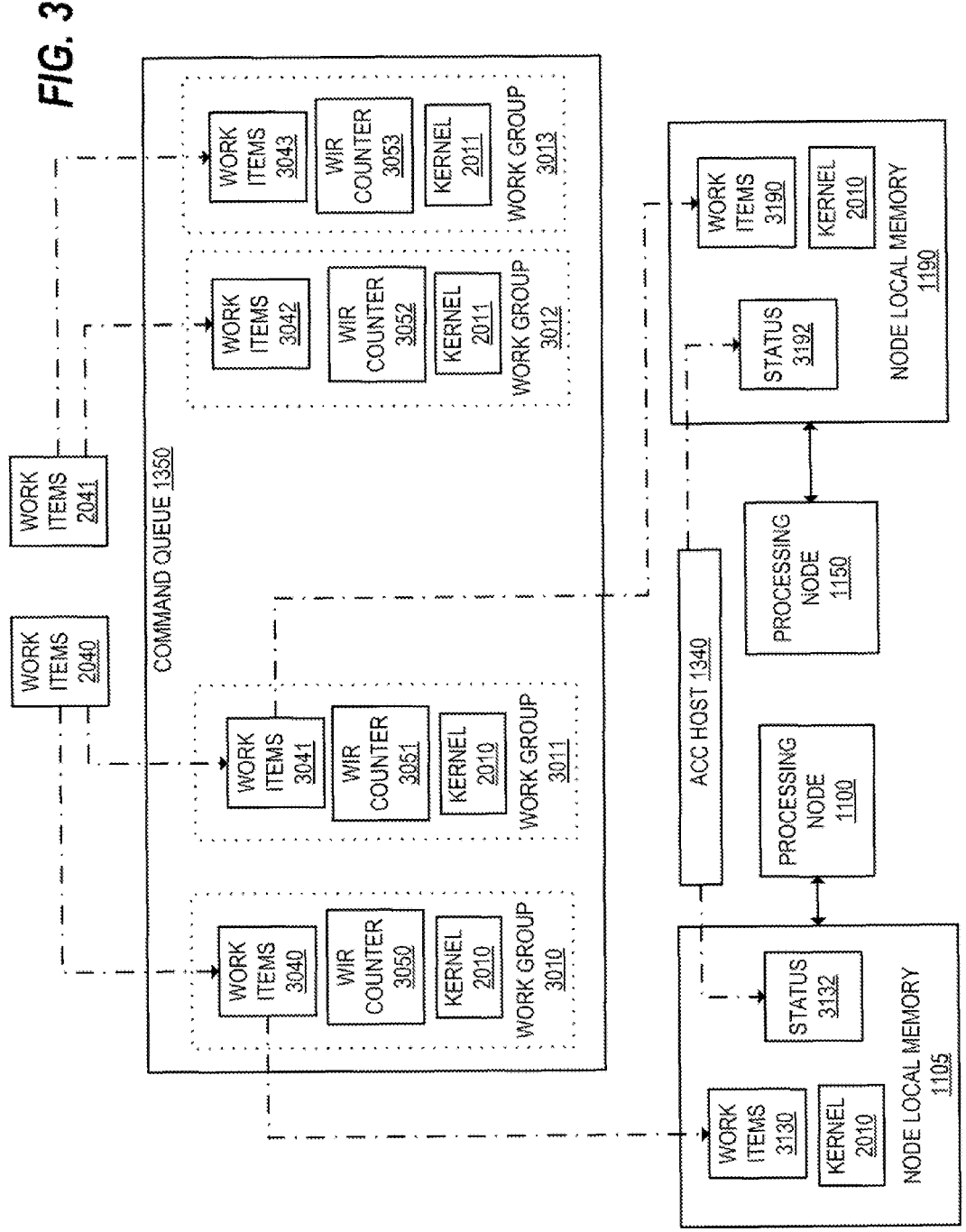
Figure 4:
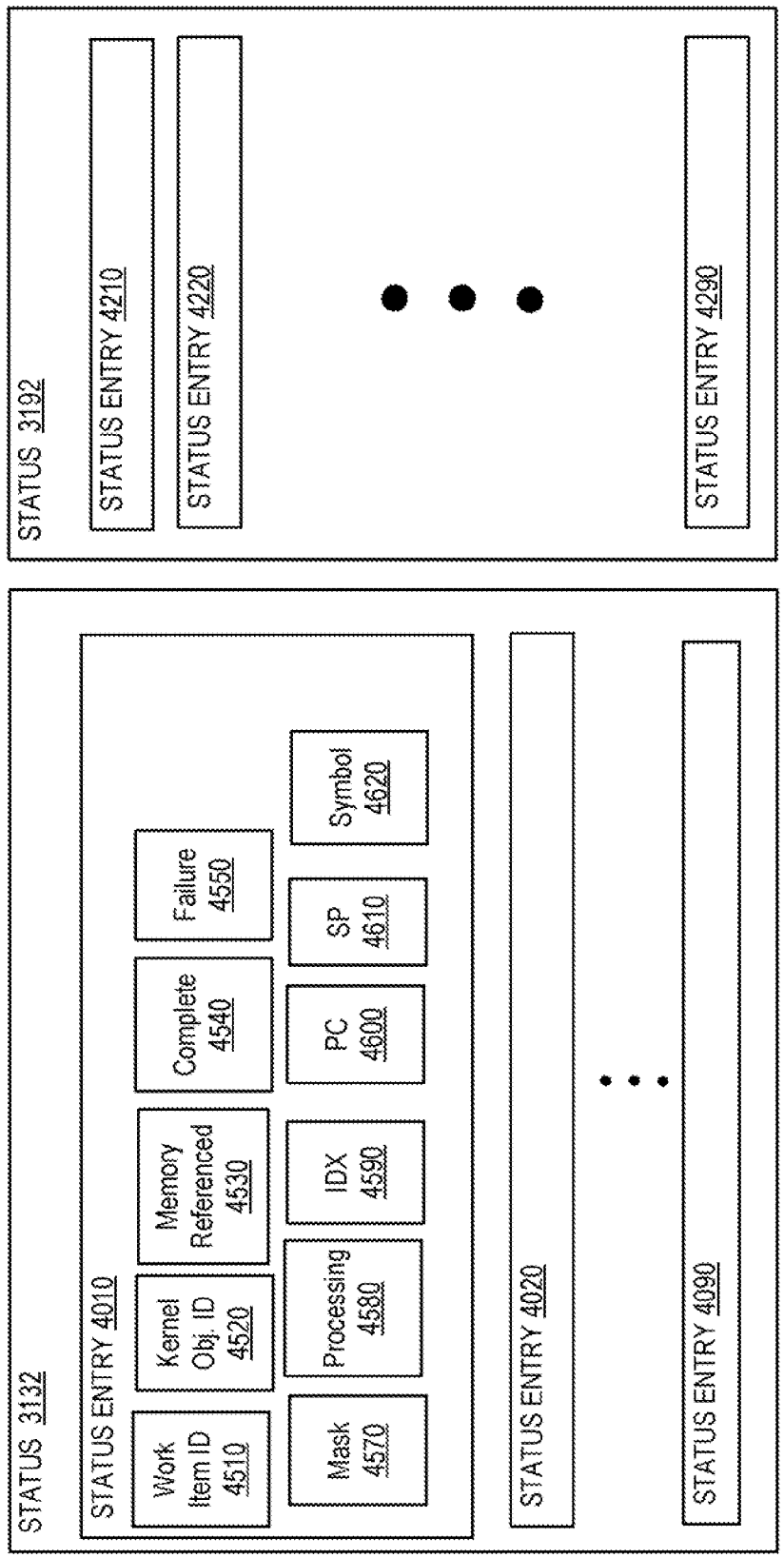
Figure 5:
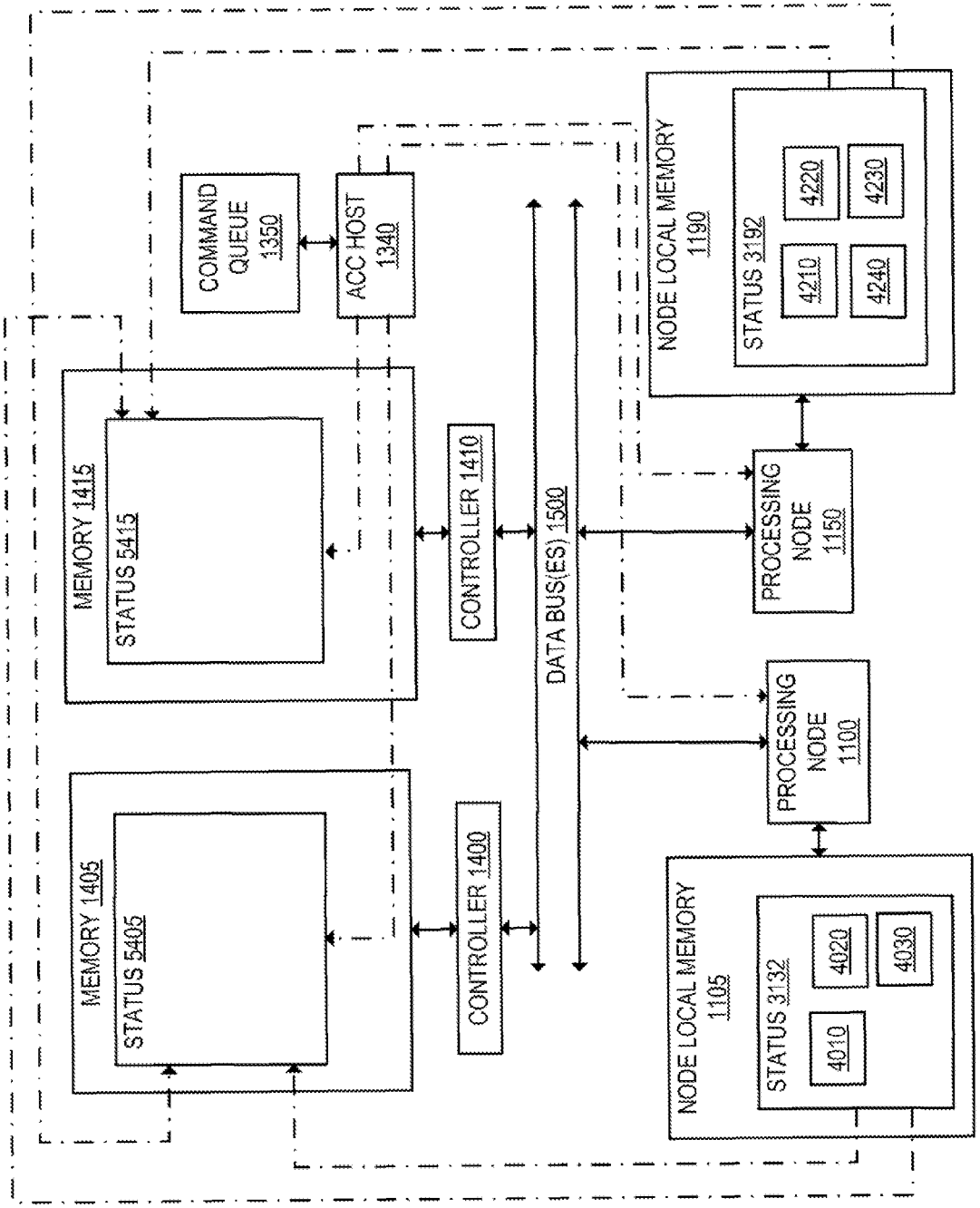
Figure 6:
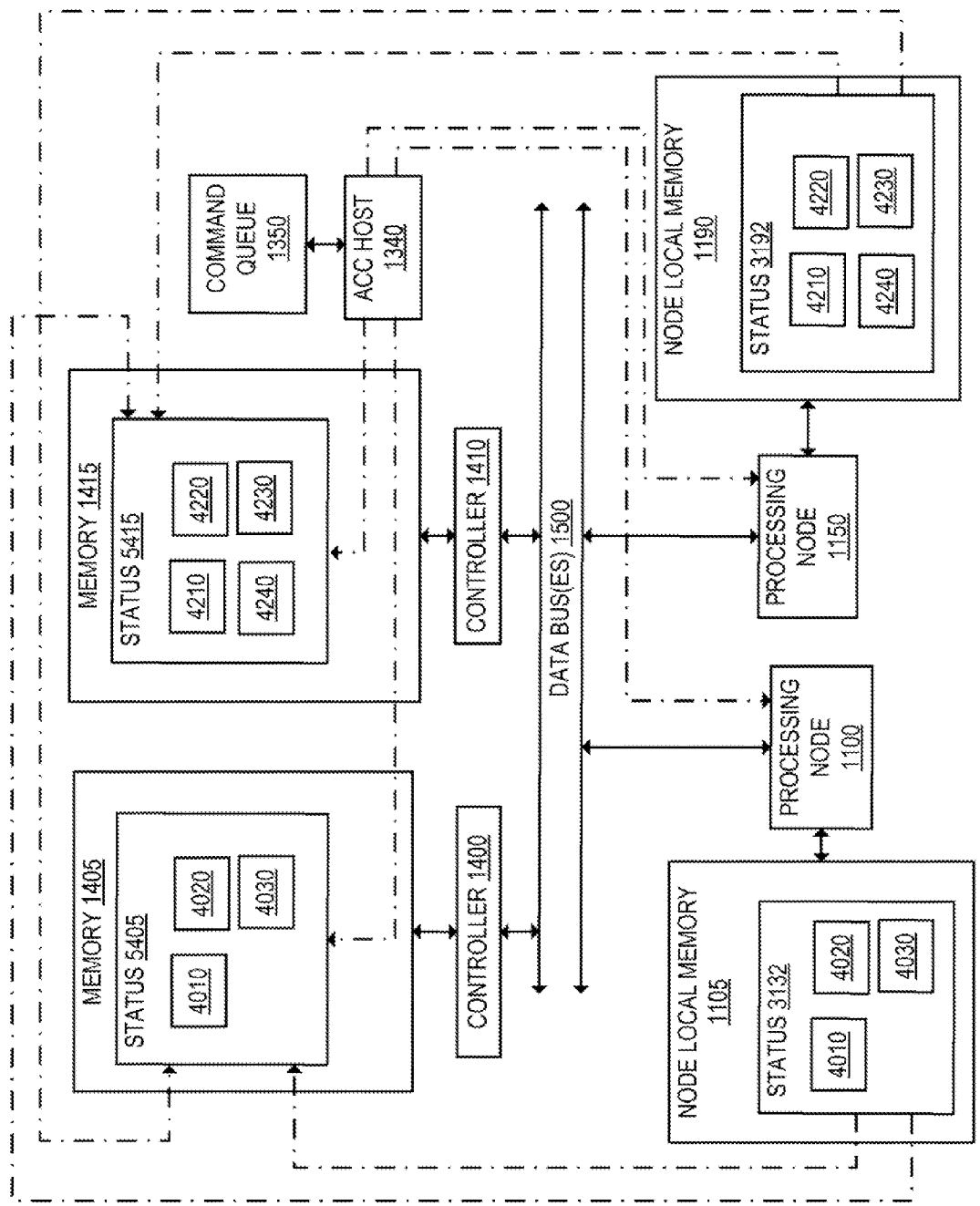
Figure 7:
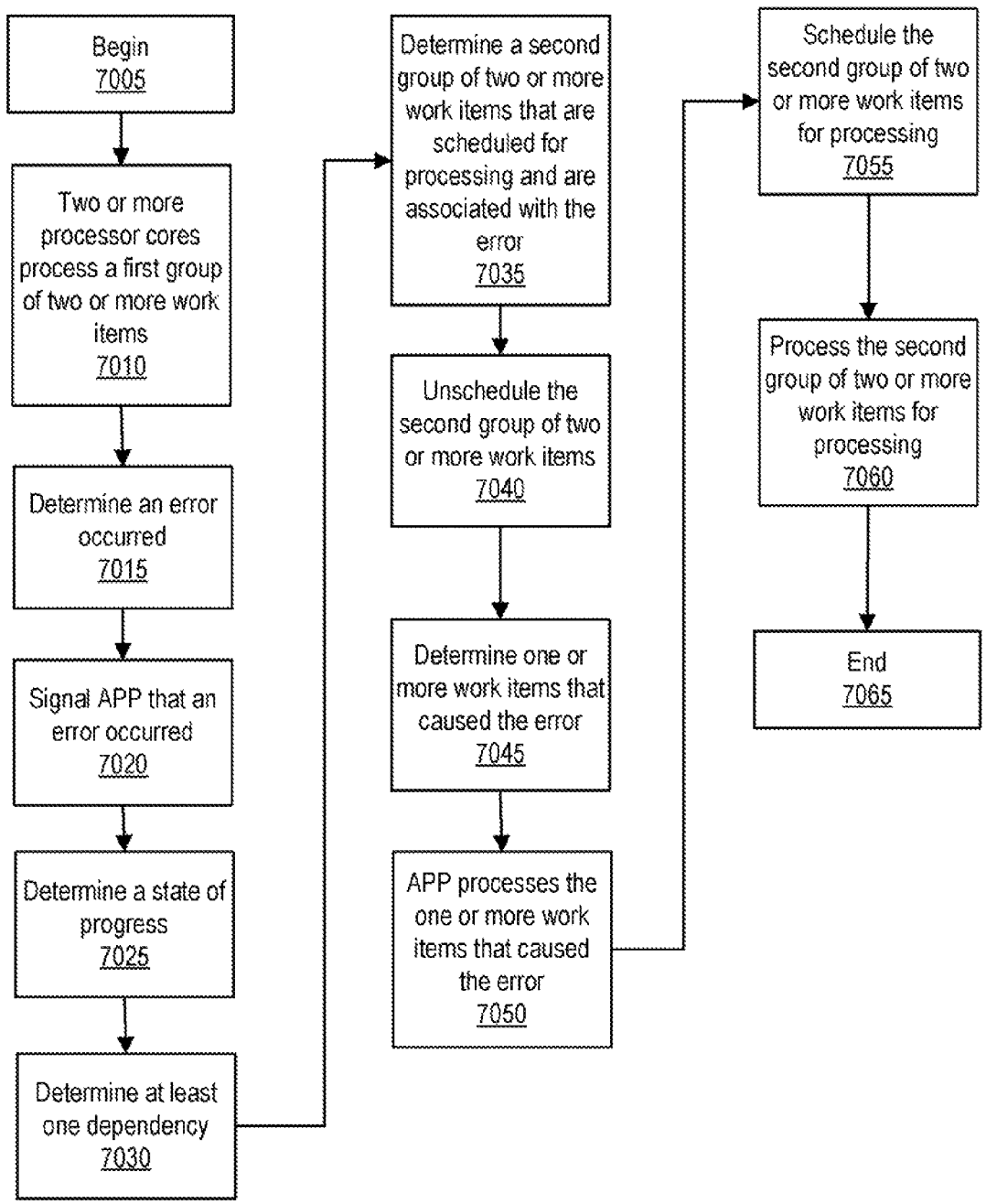
Figure 8:
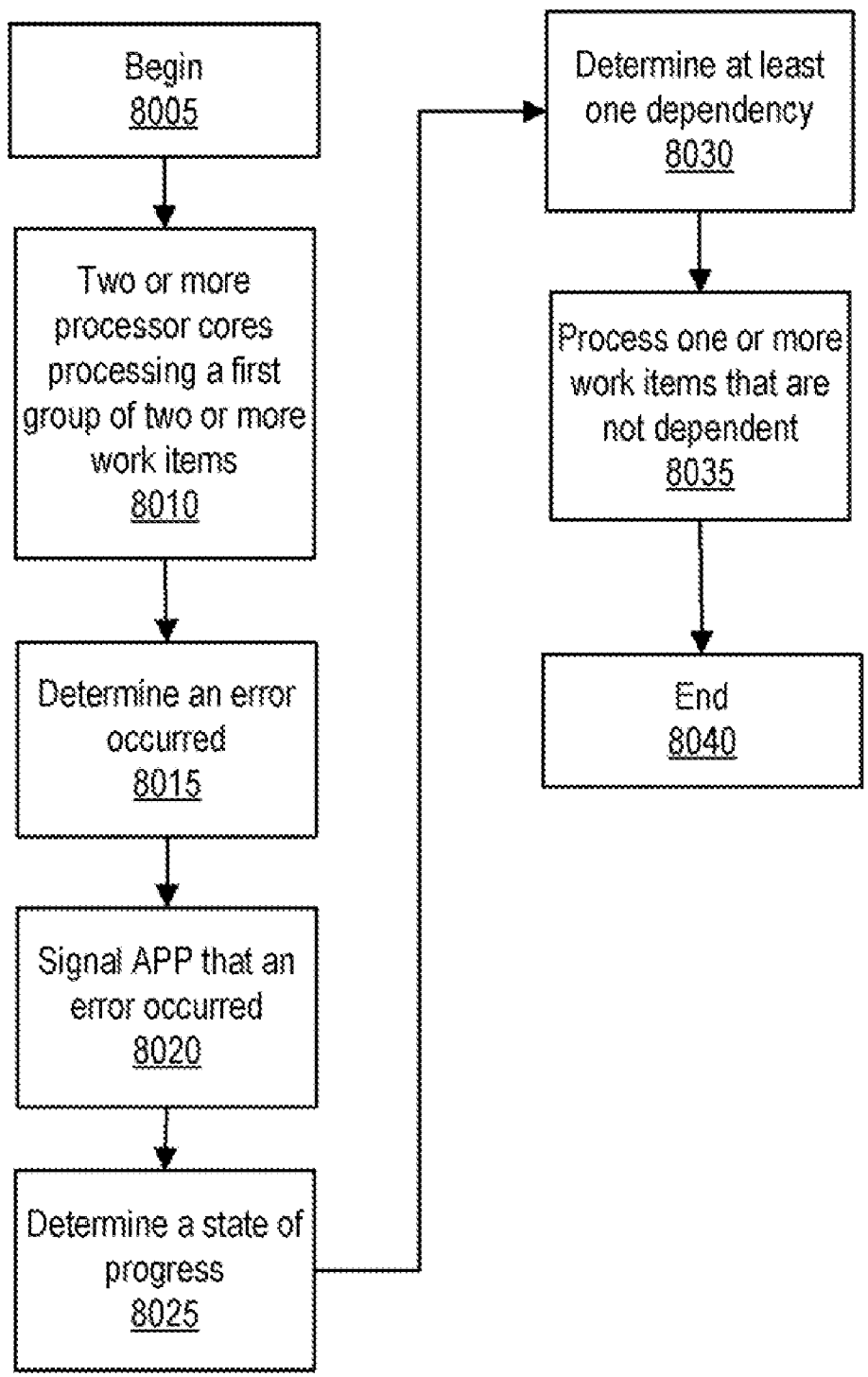

The claimed subject matter and equivalents thereof will best be understood by reference to the following detailed description of illustrative embodiments when read in conjunction with the accompanying figures, wherein:

FIG. 1 provides a block diagram of a multi-node, distributed data processing system, according to one or more embodiments;

FIG. 2 provides a block diagram of a logical flow of a multi-node data processing system, according to one or more embodiments;

FIG. 3 provides an exemplary block diagram of work items portioned and distributed to two or more nodes, according to one or more embodiments;

FIG. 4 provides an exemplary block diagram of a status and status entries operable to be stored in a memory, according to one or more embodiments;

FIG. 5 provides an exemplary block diagram of status entries, according to one or more embodiments;

FIG. 6 provides an exemplary block diagram of status entries and transferred status entries, according to one or more embodiments;

FIG. 7 provides a method for operating a data processing system, according to one or more embodiments; and FIG. 8 provides a method for operating a data processing system, according to one or more embodiments.

DETAILED DESCRIPTION

Disclosed are a method, a system and a computer program product of operating a data processing system that can include or be coupled to multiple processor cores, according to one or more embodiments. In one or more embodiments, an error can be determined while two or more processor cores are processing respective two more work items of a first group of two or more work items, and the error can be signaled to an application. The application can determine a state of progress of processing the two or more work items and at least one dependency from the state of progress. In one or more embodiments, a second group of two or more work items that are scheduled for processing can be unscheduled, in response to determining the error. In one example, an acceleration host can use a scheduler to unschedule the second group of two or more work items that are scheduled for processing. In one or more embodiments, at least one work item can be determined to have caused the error based on the state of progress. The application can process the at least one work item that caused the error or data that includes the at least one work item that caused the error, and the second group of two or more work items can be rescheduled for processing. In one or more embodiments, the second group of two or more work items can be dependent on a result from the at least one work item that caused the error and/or share a memory object, with the at least one work item that caused the error, that is not a read-only memory object. In one or more embodiments, the second group of two or more work items can be dependent on one or more from the first group of two or more work items and/or share a memory object, with the first group of two or more work items, that is not a read-only memory object.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, the following terms, which are utilized herein, are defined as follows:

(1) Work Item: a base element of a data set (e.g., a byte, a string, an integer number, an floating point number, a pixel, an array, a data structure, etc.).
(2) NDRange Size: a number of work items in an index space.
(3) Kernel: a function that processes a work item to produce a result, where the function is implemented by one or more instructions executable by a processor core.
(4) Kernel Object: a kernel and argument(s) to use when executing the kernel.
(5) Work Item Remaining (WIR) Counter: a counter that tracks the number of work items within a work element and which is decremented each time one or more work items are removed by a processor core or node. The amount of the decrement is equal to the number of work items removed by the processor core or the node, and the counter is decremented until the counter value reaches or goes below zero.

As provided herein, the invention is applicable to any number of different configurations of such multi-core systems, including ones configured as large scale parallel processing system, or ones configured as non-uniform memory access (NUMA) processing system, or other type of multi-core processing system, including parallel processing systems. The descriptions provided herein assume no specific architecture, other than a multi-core architecture. However, certain features are assumed implemented in multi-node architectures (i.e., system with multiple processing nodes) in which one or more processing nodes exhibit low latency when accessing a global/shared memory structure, while other features are assumed to be implemented in multi-node architectures in which one or more processing nodes exhibit high latency when accessing the global/shared memory structure.

As further described below, implementation of the functional features of the invention is provided within processing nodes and involves use of a combination of hardware, firmware, as well as several software-level constructs. The presented figures illustrate both hardware and software components within an example distributed, multi-node computing environment in which multiple physically separate processing nodes, interconnected via a general system interconnect and/or a network interface device (NID) and/or host fabric interface (HFI) and/or one or more other forms of interconnects (e.g., switches, and the like), provide a distributed data processing system that executes one or more ND work sets via a plurality of processor cores. The illustrative and described embodiments assume that the system architecture may be scaled to a much larger number of processing nodes.

Turning now to the figures, and in particular to FIG. 1, a block diagram of a multi-node, distributed data processing system (DPS) is illustrated, according to one or more embodiments. As shown, DPS 1000 includes a processing system 1005, which can be coupled to one or more remote processing systems 1015 and 1020 via an interconnect 1600, such as a network fabric or switch. A illustrated, processing system 1005 can include two or more processing nodes of which processing nodes 1100 and 1150. Processing nodes 1100 and 1150 are coupled to system interconnect 1500, which serves as and may interchangeably be referred to as data buses.

In one or more embodiments, system interconnect 1500 provides connectivity within processing system 1005 to two or more devices, including memory controllers 1400 and 1410, a storage medium 1310, a processor 1300, and input/output (I/O) controller 1420. In one or more embodiments, I/O controller 1420 provides control over/by one or more I/O devices 1425, such as a pointing device, display monitor, and the like. Memory controllers 1400 and 1410 controls access to respective system memory devices 1405 and 1415. Depending on system design, memory controllers 1400 and 1410 may be assigned to respective processing nodes 1100 or 1150 and/or may be physically located on the processor chip or at some other location within the overall system architecture. It is appreciated that the presence of multiple memory controllers 1400 and 1410 is a design parameter, and processing system 1005 may be configured with a single memory controller, according to one or more embodiments.

In addition to system memory devices 1405 and 1415 of processing system 1005, processing nodes 1100 and 1150 can be coupled to respective associated node local memories 1105 and 1195, which can allow staging of work at the processing node without requiring the processing node to retrieve each piece of work individually from a system memory (e.g., one of system memories 1405 and 1415) or other remote (or high latency) location. In one or more embodiments, node local memory 1105 can be a shared memory for each of processor cores 1110-1117, and/or node local memory 1195 can be a shared memory for each of processor cores 1160-1167. For example, node local memory 1105 can be accessed in an asynchronous fashion by each of processor cores 1110-1117, and node local memory 1195 can be accessed in an asynchronous fashion by each of processor cores 1160-1167. For instance, node local memory 1105 can be accessed via direct memory access (DMA) by each of processor cores 1110-1117, and/or node local memory 1195 can be accessed via DMA by each of processor cores 1160-1167.

In one or more embodiments, each of processing nodes 1100 and 1150 includes two or more processor cores, although it is possible for the nodes to be single core nodes. As shown, processor node 1100 includes N+1 cores, numbered core_0 though core_N, where N is an integer greater than zero. Likewise, processor node 1150 comprises M+1 cores, numbered core_0 though core_M, where M is an integer greater than zero. So as to simplify the description of one or more embodiments, both N and M are assumed to be integer seven (7), such that processing node 1100 includes eight (8) processing cores 1110-1117 and processing node 1150 includes eight (8) processor cores 1160-1167. Where utilized herein, the term processing units are assumed to be synonymous with processor cores. In one or more embodiments, each processor core of processor cores 1110-1117 and 1160-1167 can implement an instruction set architecture (ISA) and can execute instructions from the ISA. In one or more embodiments, processor cores 1110-1117 can implement an ISA that is different from an ISA that can be implemented by processor cores 1160-1167.

The use of the integer variables "N" and "M" to cap the number of processor cores in respective processing nodes 1100 and 1150 merely indicates that each processing node can include a variable number of separate processor cores, with N and M being integers of any size greater than zero (0) (assuming a multi-core implementation for respective processing nodes). The number of processing nodes deployed in a given system architecture is implementation-dependent and can vary. It is appreciated that the embodiments described herein enables scaling to a much larger number of processing nodes and even larger number of processor cores. In one or more embodiments, processing system 1005 can be the source of one or more ND Range work sets that are generated and processed by the processor cores within DPS architecture 1000.

As further illustrated, processing system 1005 includes storage 1310, within which are stored one or more of the firmware and software components that enable generation of work and ND Range work sets for execution by one or more of the processing nodes. In one or more embodiments, storage 1310 can store of or more of one or more operating systems (OSes) 1320-1322, one or more applications (APPs) 1330-1332, a compiler 1325, a scheduler 1335, and a acceleration (ACC) host 1340. In one or more embodiments, scheduler 1335 can include logic and/or program instructions that are executed by processor 1300, processor 1310 or a processing core (e.g., processing cores 1110-1117 and 1160-1167) to receive one or more kernels from a compiler and schedule the work (e.g., one or more kernels and/or data sets) for dispatch to/by one or more of the multiple processor cores within the DPS architecture 1000. In one or more embodiments, a data set that is to be operated on is retrieved by compiler 1325 from one or more of applications 1330-1332 and/or OSes 1320-1322, or from some other source (not illustrated herein). In one or more embodiments, compiler 1325 includes a just in time (JIT) compiler that can produce one or more kernels in accordance with a method or process associated with processing the data set. For example, application 1330 can implement a method or process associated with processing the data set, and in response to an execution of application 1330, the JIT compiler can produce one or more kernels to process the data set.

In one or more embodiments, processing system 1005 includes or is coupled to a switch or other global interconnect (e.g., interconnect 1600) to which multiple other processing systems may be connected. As illustrated, processing system 1005 is communicatively connected to remote processing systems 1015 and 1020 via interconnect 1600, which may be or include a network fabric or switch. As shown, connection to interconnect 1600 is provided via network interface controller (NIC) 1430, which may be or include a host fabric interface (HFI). As illustrated, NIC 1430 is coupled to system interconnect 1500. Interconnect 1600 may be a single general interconnect to which all nodes connect or may include one or more subnets (not shown) connecting a subset of processing nodes to each other and/or to processing system 1005, in one of several alternate configurations.

In one or more embodiments, one or more of processing systems 1015 and 1020 can provide additional computing resources within DPS 1000. For example, each of processing systems 1015 and 1020 can include one or ore structures and/or functionalities similar to or the same as described with reference to processing system 1005. In one or more embodiments, a relative distance between a remote computing device (e.g., one of processing systems 1015 and 1020) from a work staging area within processing system 1005, one or more processing cores included in the remote computing device can be described as exhibiting high latency during shared work retrieval and/or balancing. Those skilled in the art will appreciate that DPS architecture 1000 can include additional components, such as interconnect bridges, ports for connection to networks or attached devices, and the like (none of which are illustrated herein).

With reference now to FIG. 2, a block diagram of a logical flow of a multi-node data processing system is illustrated, according to one or more embodiments. In addition to the hardware structure presented processing system 1005 of FIG. 1, which has been previously described, FIG. 2 provides a one or more configurations and/or functionalities of the software and/or firmware components described with reference to FIG. 1 as well, which enable one or more functional features of one or more embodiments.

As shown, processing node 1100 is associated with a node mask (NM) 2100, and processing node 1150 is associated with a NM 2150. In one or more embodiments, each of node masks (NMs) 2100 and 2150 can provide a unique bit mask identifier to identify an associated processing node. In one or more embodiments, node masks are used to enable node level scheduling and/or routing of work, as described further below.

In a similar fashion, a core mask (CM) or processing unit mask (PUM) can provide a bit mask identifier to identify an associated/linked/encoded processing core and to uniquely identify the specific processor core from other processor cores within a node that includes the associated/linked/encoded processing core. As illustrated, cores 1110-1117 are associated with core masks (CMs) 2110-2117, respectively, and cores 1160-1167 are associated with CMs 2160-2167, respectively. For example, core_0 1110 is tagged with bit mask 2110, core_1 1111 is tagged with bit mask 2111, core_N 1117 is tagged with bit mask 2117.

In one example, each of NMs 2100 and 2150 can include a bit bask of $X_0X_1$, where $X_i$ can include values of "0" and "1". For instance, NM 2100 can include a bit mask of "10", and in another instance, NM 2150 can include a bit mask of "01". In another example, each of processor cores 1110-1117 and 1160-1167 can include a bit mask of $Y_0Y_1Y_2Y_3Y_4Y_5Y_6Y_7$, where $Y_j$ can include values of "0" and "1". In one instance, cores 1110 and 1160 can include a bit mask of "10000000". In a second instance, cores 1111 and 1161 can include a bit mask of "01000000". In another instance, cores 1117 and 1167 can include a bit mask of "00000001". In one or more embodiments, individual processing cores can be addressed and/or identified by a combination of node mask and core mask. In one example, a processing core can be identified by $X_0X_1Y_0Y_1Y_2Y_3Y_4Y_5Y_6Y_7$ or $Y_0Y_1Y_2Y_3Y_4Y_6Y_7X_0X_1$, depending on implementation. In one or more embodiments, processing system 1005 can include multiple nodes that can be associated with multiple node masks. In one example, each of the multiple node masks, associated with multiple processor cores, can include $X_0 \cdots X_P$, where P can be an integer greater than zero (0). In one or more embodiments, each of multiple processing nodes can include multiple processing cores that can be associated with multiple core masks. In one example, each of the multiple core masks can include $Y_0 \cdots Y_Q$, where Q can be an integer greater than zero (0).

Turning now to the functional blocks in the upper portion of the figure, the executable/execution code of example application 1330 is forwarded to compiler 1325, which processes the instructions/codes to one or more generate commands and/or one or more kernels 2010-2014 and/or one or more work items 2040-2042 from one or more of data sets 2020-2021, according to one or more embodiments. For example, the one or more commands can provide work divided into one or more work items 2040-2042, each associated with a kernel (e.g., a kernel of kernels 2010-2014). The kernels 2010-2014 are forwarded to scheduler 1335. In one or more embodiments, scheduler 1350 includes a scheduler that performs the functions of: (1) scheduling (placing) work elements into command queue 1350; (2) selectively allocating the work items to selected processor cores; generating an attached processing unit (APU) (e.g., node) mask (e.g., a bit mask that includes a combination of a node mask and a core mask) corresponding to the selected processor cores allocated/assigned the work item; and appending/linking or otherwise associating the APU mask to the work element by forwarding the APU mask to command queue 1350.

In one or more embodiments, the selectively allocating of the work items to selected processor cores involves and/or is based on a scheduling criteria that takes into account workload allocation and work balancing across processing system 1005 and/or DPS 1000, processing capabilities of the different types of processing units, e.g., CPUs (central processing units), GPUs (graphics processing units), SPUs (stream processing units), among others, and other factors, which may be programmed by the designer of the scheduler. In one or more embodiments, the division of work can be on a per processing node basis, rather than at the granularity of processor cores, the APU mask represents a node mask, identifying the specific processor node, and any processor core at that selected processing node may then consume the work items associated with the node mask.

In one or more embodiments, the work items associated with the bit mask can be routed from command queue 1350 to one or more processing cores via the associated bit mask. In one example, the work items associated with the bit mask can be routed from command queue 1350 to the one or more cores via the associated bit mask by a processor (e.g., core 1110, core 1160, processor 1300, etc.). In another example, the work items associated with the bit mask can be routed from command queue 1350 to the one or more cores via the associated bit mask by the one or more cores retrieving the one or more work items from command queue 1350 using the associated bit mask.

As illustrated, ACC host 1340 can be functionally coupled to processing nodes 1100 and 1150, node local memories 1105 and 1190, APP 1330, and memories 1405 and 1415. In one or more embodiments, a shared ACC host storage 2400 can include and/or be implemented with one or more of memories 1405 and 1415, and shared ACC host storage 2400 can be used as global storage for status of work items processed on nodes of processing system 1005. In one or more embodiments, node local memories 1105 and 1190 can be used as node local storage for status of work items processed on respective nodes 1100 and 1150.

Turning now to FIG. 3, an exemplary block diagram of work items portioned and distributed to two or more nodes is illustrated, according to one or more embodiments. As shown, work items 2040 can be divided into portions, e.g., work items 3040 and 3043, and work items 2041 can be divided into portions, e.g., work items 3042 and 3043. In one or more embodiments, work items 3040-3043 can be associated with respective WIR counters 3050-3053. For example, WIR counter 3050 can be track a count of work items remaining in work items 3040. For instance, some or all of the work items of work items 3040 can be routed/retrieved to/by a node or can be routed/retrieved to/by a processor core and WIR counter 3050 can provide a number or work items remaining in work items 3040 after such routing/retrieving. For example, WIR counter 3050 can be decremented after such routing/retrieving. In one or more embodiments, work items can be grouped with a respective work counter and a respective kernel that can be used to process the work items. As illustrated, work groups 3010-3013 can include respective work items 3040-3043 and respective WIR counters 3050-3053. As shown, work groups 3010 and 3011 can include kernel 2010, and work groups 3012 and 3013 can include kernel 2011. In one or more embodiments, a kernel included in a work group can be a pointer to a function. For example, the pointer to the function can reduce an amount of memory used for the work group.

As illustrated, node local memory 1105 can include a status 3132, kernel 2010 and work items 3130, and node local memory 1190 can include a status 3192, kernel 2010 and work items 3190. In one or more embodiments, each of work items 3130 and 3190 can include respective portions of work items 3040 and 3041 retrieved/routed from command queue 1350. In one or more embodiments, statuses 3132 and 3192 can store information regarding processing of work items processed and/or being processed on respective nodes 1130 and 1190. In one or more embodiments, statuses 3132 and 3192 are stored at addresses in respective memories 1105 and 1190 that are available to and/or accessible by ACC host 1340.

Turning now to FIG. 4, an exemplary block diagram of a status and status entries operable to be stored in a memory is illustrated, according to one or more embodiments. In one or more embodiments, status 3132 can include information regarding processing of work items processed and/or being processed on a node or processor core. As shown, a status 3132 can include one or more status entries 4010-4090. In one or more embodiments, status entry 4010 can include one or more information elements, such as one or more of work item identification (ID) 4510, kernel object ID 4520, memory referenced 4530, complete 4540, failure 4550, mask 4570, processing 4580, index (IDX) 4590, program counter (PC) 4600, stack pointer (SP) 4610, and symbol 4620, among others.

In one or more embodiments, work item ID 4510 can be used to identify a specific work item that has been processed or is being processed. In one example, a failure can occur during processing of a work item. In one instance, the failure can occur during processing of the work item associated with work ID 4510. In a second instance, the failure can occur during or after processing of a work item not associated with work ID 4510. In one or more embodiments, kernel object ID 4520 can be used to identify a kernel object, and/or memory referenced 4530 can be used to identify one or more memory addresses referenced in processing the work item associated with work item ID 4510. For example, memory referenced 4530 can include a data structure, such as a linked list or array with entries indicating two or more memory addresses accessed while processing the work item associated with work item ID 4510.

In one or more embodiments, complete 4540 can indicate whether or not the work item identified by work item ID 4510 has completed being processed. For example, another work item might fail, and processing of one or more other work items can be halted or stopped, and complete 4540 can indicate whether or not the work item identified by work item ID 4510 has completed being processed. In one or more embodiments, failure 4550 can indicate whether or not the work item identified by work item ID 4510 failed.

In one or more embodiments, mask 4570 can include a bit mask associated with the work item identified by work item ID 4500. For example, mask 4570 can include a core mask, a node mask, or an APU mask. In one or more embodiments, processing 4580 can indicate whether or not the work item is being processed, and/or IDX 4590 can include a processing index. For example, the processing index can include one or more of a timestamp and a clock count (e.g., a processor clock count, a system clock count, etc.). In one or more embodiments, symbol 4620 can include a symbol of function or subroutine that is being called from a kernel that processing a work item associated with work item ID 4510. For example, the kernel may have been compiled with debugging symbols that can allow a debugger to map object code to source code, and symbol 4620 may be used to map a place in the kernel to source code.

In one or more embodiments, status entry 4010 can be created and/or populated upon or after routing/retrieving a work item from command queue 1350, and/or status entry 4010 can be updated during and/or after processing the work item. In this fashion, a system state can be analyzed and/or recreated after a failure of processing one or more work items. In one or more embodiments, each of status entries 4020-4090 can include similar or same elements and/or functionality described with reference to status entry 4010. In one or more embodiments, status 3192 can include similar or same elements and/or functionality described with reference to status 3132, and each of status entries 4210-4290 can include similar or same elements and/or functionality described with reference to status entry 4010. In one or more embodiments, each of statuses 3132 and 3192 can include any number of status entries.

Turning now to FIG. 5, an exemplary block diagram of status entries is illustrated, according to one or more embodiments. As shown, status 3132 can includes status entries 4010-4030, and status 3192 includes status entries 4210-4240. As illustrated, memory 1405 can include a status 5405, and memory 1415 can include a status 5415. In one or more embodiments, status entries 4010-4030 and 4210-4240 can include information associated with work items that are being processed respective processing nodes 1100 and 1150.

Turning now to FIG. 6, an exemplary block diagram of status entries and transferred status entries is illustrated, according to one or more embodiments. As shown, status entries 4010-4030 have been copied to status 5405, and status entries 4210-4240 have been copied to status 5415. In one or more embodiments, ACC host 1340 accessed statuses 3132 and 3192 to copy status entries 4010-4030 to status 5405 and to copy status entries 4210-4240 to status 5415. For example, ACC host 1340 accessed statuses 3132 and 3192 to copy respective status entries to respective statuses 5405 and 5415 so APP 1330 can access status entries 4010-4030 and 4210-4240. In one or more embodiments, ACC host 1340 transferred status entries of statuses 3132 and status 3192 to respective statuses 5405 and 5415 in response to a failure in processing a work item and/or an error in processing a work item. For example, there may have been a failure in processing a work item and/or an error in processing a work item associated with work item ID 4510 of status entry 4010. In one or more embodiments, all work items being or will be processed in a work group associated with the work item associated with work item ID 4510 can be halted or deemed as failed. For example, work items 3040 of work group 3010 can be deemed as failed.

Turning now to FIG. 7, a method of operating a data processing system is illustrated, according to one or more embodiments. The method begins at initiation block 7005. At block 7010, two or more of processor cores 1110-1117 can process a first group of two or more work items. For example, each of the two or more of processor cores 1110-1117 can respectively process each of the first group of two or more work items. At block 7015, ACC host 1340 can determine that an error occurred while processing the first group two or more work items. In one or more embodiments, ACC host 1340 can receive a signal from a processor core of the two or more of processor cores 1110-1117. In one example, a kernel executed by the processor core of the two or more of processor cores 1110-1117 can return a value that indicates that a work item has been processed or an error has occurred. In a second example, the processor core of the two or more of processor cores 1110-1117 can indicate that an exception has occurred, where the exception was invoked because an error has occurred. In one instance, the exception can indicate a page fault. In another instance, the exception can indicate that a divide by zero occurred.

At block 7020, ACC host 1340 can signal APP 1330 that the error has occurred. At block 7025, ACC host 1340 can determine a state of progress. For example, ACC host 1340 can determine a state of progress of processing a data set, such as data set 2020. In one or more embodiments, ACC host 1340 can access one or more of memories 1105 and 1190 to determine a state of progress of processing a data set. In one example, ACC host 1340 can access one or more of status entries 4010-4030 to determine a state of progress of processing a data set. In another example, ACC host 1340 can access one or more of status entries 4210-4240 to determine a state of progress of processing a data set. At block 7030, ACC host 1340 can determine at least one dependency associated with the error. For example, ACC host 1340 can access scheduler 1335 to determine at least one dependency associated with the error. In one instance, element 4540 of status entry 4010 can indicate that processing a work item associated with work item ID 4510 is not complete, and scheduler 1335 can indicate one or more dependencies of work item associated with work item ID 4510. In another instance, element 4550 of status entry 4010 can indicate that processing a work item associated with work item ID 4510 has failed, and scheduler 1335 can indicate one or more dependencies of work item associated with work item ID 4510.

At block 7035, ACC host 1340 can determine a second group of two or more work items that are scheduled for processing and are associated with the error. For example, the second group of two or more work items can be dependent on one or more results from processing of one or more work items that caused the error. In one instance, scheduler 1335 can indicate to ACC host 1340 that work group 3012 is dependent upon the work item associated with work item ID 4510. In another instance, scheduler 1335 can indicate to ACC host 1340 that work group 3012 is dependent upon one or more memory objects shared by the work item associated with work item ID 4510, where the one or more memory objects are not or cannot be determined to be read-only.

At block 7040, ACC host 1340 can use scheduler 1335 to unschedule the second group of two or more work items that are scheduled for processing and that are associated with the error. For example, the second group of two or more work items can be schedule for processing in command queue 1350. In one instance, ACC host 1340 can remove the second group of two or more work items from command queue 1350. In another instance, a number of work items remaining can be associated with the second group of two or more work items, and ACC host 1340 can use scheduler 1335 to change the number or work items remaining to zero to indicate that the second group of two or more work items have been unscheduled and/or are not to be processed (at this point). For example, scheduler 1335 can change WIR counter 3052 to zero to indicate that work group 3012 have been unscheduled and/or are not to be processed (at this point).

At block 7045, ACC 1340 and/or APP 1330 can determine one or more work items that caused the error. In one or more embodiments, one or more of status entries 4010-4030 and 4210-4240 can be used to determine the one or more work items that caused the error. For example, element 4550 of status entry 4010 can indicate that processing of a work item associated with work item ID 4510 failed. At block 7050, APP 1330 can process the one or more work items that caused the error. In one or more embodiments, APP 1330 can access one or more of memories 1405 and 1415 to access one or more of status entries 4010-4030 and 4210-4240 in processing the one or more work items that caused the error. In one or more embodiments, APP 1330 can be executed by processor 1300, and APP 1330 can process the one or more work items that caused the error. In one example, the one or more work items that caused the error can be included in data set 2020, and portioning data set 2020 such that two or more of processor cores 1110-1117 can process data set 2020 may have caused the error and the one or more work items that caused the error. In one or more embodiments, APP 1330 can process at least a portion of data set 2020 associated with the one or more work items that caused the error, thereby effectively processing the one or more work items that caused the error.

At block 7055, ACC host 1340 can use scheduler 1335 to schedule the second group of two or more work items for processing. For example, scheduler 1335 can schedule work group 3012. In one or more embodiments, the second group of two or more work items can be scheduled for processing after APP 1330 processes the one or more work items that caused the error. At block 7060, two or more of processor cores 1110-1117 can process the second group of work items. The method then ends at block 7065.

Turning now to FIG. 8, a method for operating a data processing system is illustrated, according to one or more embodiments. Blocks 8005-8030 and 8040 can be described with reference to block 7005-7030 and 7065, respectively. At block 8035, one or more of processor cores 1110-1117 can process one or more work items that are not dependent on any result associated with the error. For example, a work item associated with work item ID 4510 may have failed to be processed. However, one or more work items that are not dependent on a result of processing the work item associated with work item ID 4510 can be processed by one or more of processor cores 1110-1117.

Features of the provided embodiments can advantageously be implemented in multi-node processing systems which exhibit low data transfer and cross communication latencies between the processor cores and a memory location of a DPS. Given that the nodes can retrieve work from the central/common command queue, the latency to the command queue for the different nodes can be relative short, such that the overall work retrieval process incurs an acceptable latency penalty in overall processing time for the processing cores that are grabbing work from the command queue.

With the implementation of the single command queue, the need to synchronize across multiple command queues of multiple nodes is substantially eliminated and can allow for dynamic allocation of various subdevices or virtual devices. The described embodiments are adapted for implementation on multi-processor compute systems (or system architecture) that exhibit small penalty (latency) when synchronizing across compute nodes. For example, with NUMA nodes that are connected via a "local" fabric, such as within a single physical system (e.g., processing system 1005), there is a relatively small latency penalty when synchronizing distributed work of a single kernel and work items across multiple nodes. This further enables the expanding/implementing of work and data intensive operations to/on NUMA systems with low cross node latency.

With the described embodiments, multiple individual command queues tied to separate nodes may not be required for NUMA affinity, and a single command queue structure is provided. With the single command queue implementation.

The above embodiments can be applicable to systems that have NUMA regions close enough so they can share the common command/work queue efficiently. This is especially true for workloads where a common function is being executed multiple, independent times. The common/global command queue is used by all NUMA nodes. Each work element in that GCQ then contains an APU mask (NODE-MASK), work remaining count (in the case of multiple iterations of a process) and a seen count. With this configuration, work is scheduled as follows: (a) the processing unit checks if the unit's NUMA bit is set in the next work element's APU mask; (b) if the unit's NUMA bit is not set, the processing unit increments the seen count, indicating that the unit has finished with the work element, and advances to the next element (c) If the unit's NUMA bit is set, the unit decrements the work remaining count by a tunable "chunk size", based on the actual amount of work retrieved from the work element by the processing unit; (d) If the result of the decrement is a value indicating that there is no more work (e.g., 0 or −1), the processing unit increments the seen count, which indicates that the processing unit has finished with the element. The processing unit then advances to the next work element; (e) if the processing unit is the last processor core to see the element (i.e., seen count is equal to zero), indicating all the processor cores have seen the work item at least one, the processing unit marks the location in the global queue as "free."

Certain of the features of the described embodiments may lend themselves to N Dimensional (ND) Range processing/execution paradigms, such as provided by OpenCL™ and similarly structured applications executed on multi-core data processing systems in which an execution command contains the information necessary to efficiently execute and balance work load of the command, which may include data or task parallel processing requirements. Each command includes information corresponding to the total number of work groups within the command to be executed, the number of work groups remaining to be computed, the number of work groups already processed, the number of work groups to process at a time (reservation size). Other information provided by the commands may include the number of execution threads to process in the command and the number of execution threads that have seen the command.

Within this execution paradigm, and according to the presently described embodiments, execution units can process the commands from a single global command queue comprising multiple queue entries. As provided by the described embodiments, the execution units are processing cores, which may be located across a distributed network. However, while processor cores are employed throughout the described and illustrative embodiments as examples of execution units, in other embodiments, the execution units may be any device that executed a command, including, but not limited to, processing cores, CPUs, GPUs, SPUs, threads, and even complete computing systems.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read- only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, or by copying the code from the storage device into another storage device such as a hard disk, RAM, etc. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of operating a data processing system, comprising:
    processing a first plurality of work items using at least one kernel and using a plurality of processor cores, wherein each of the first plurality of work items is processed by an associated processor core of the plurality of processor cores;
    determining that an error occurred during said processing of the first plurality of work items;
    signaling an application that the error has occurred;
    determining a state of progress of processing the first plurality of work items;
    identifying at least one work item that caused the error based on the state of progress;
    determining at least one dependent work item of the first plurality of work items that is dependent from the at least one work item that caused the error using the state of progress;
    unscheduling the at least one dependent work item;
    executing the application using a supervisory processor; and
    processing the at least one work item that caused the error using the application and the supervisory processor.

2. The method of claim 1, further comprising:
    in response to said determining that the error occurred, determining a second plurality of work items scheduled for processing and associated with the error based on the state of progress; and
    unscheduling the second plurality of work items.

3. The method of claim 1, further comprising:
    in response to said determining that the error occurred, determining a second plurality of work items scheduled for processing and associated with the error based on the state of progress;
    unscheduling the second plurality of work items; and
    after said unscheduling the second plurality of work items and said processing the at least one work item that caused the error, scheduling the second plurality of work items for processing.

4. The method of claim 1, further comprising:
    storing status information in a memory accessible by the plurality of processor cores;
    wherein said determining the state of progress of processing the plurality of work items includes accessing the memory.

5. The method of claim 1, further comprising:
    signaling that a work item of the plurality of work items has been processed.

6. The method of claim 1, wherein said determining the state of progress of processing the plurality of work items includes using a plurality of status entries.

7. The method of claim 1, wherein said signaling the application that the error has occurred includes returning an error code from the kernel.

8. The method of claim 1, further comprising:
    after said determining at least one dependency, processing at least one work item of the first plurality of work items that is not included in the at least one dependency.

9. An article of manufacture embodied as a computer program product comprising:
    a non-transitory computer readable storage device; and
    program code on the non-transitory computer readable storage device that when executed by a processor, provides a method of operating a data processing system, the method comprising:
        processing a first plurality of work items using at least one kernel and using a plurality of processor cores, wherein each of the first plurality of work items is processed by an associated processor core of the plurality of processor cores;
        determining that an error occurred during said processing of the first plurality of work items;
        signaling an application that the error has occurred;
        determining a state of progress of processing the first plurality of work items;
        identifying at least one work item that caused the error based on the state of progress;
        determining at least one dependent work item of the first plurality of work items that is dependent from the at least one work item that caused the error using the state of progress;
        unscheduling the at least one dependent work item;
        executing the application using a supervisory processor; and
        processing the at least one work item that caused the error using the application and the supervisory processor.

10. The article of manufacture of claim 9, wherein the program code further comprising code that executes to provide additional method functions comprising:

in response to said determining that the error occurred, determining a second plurality of work items scheduled for processing and associated with the error based on the state of progress; and unscheduling the second plurality of work items.

11. The article of manufacture of claim 9, wherein the program code further comprising code that executes to provide additional method functions comprising:

in response to said determining that the error occurred, determining a second plurality of work items scheduled for processing and associated with the error based on the state of progress;

unscheduling the second plurality of work items; and after said unscheduling the second plurality of work items and said processing the at least one work item that caused the error, scheduling the second plurality of work items for processing.

12. The article of manufacture of claim 9, wherein the program code further comprising code that executes to provide additional method functions comprising:

storing status information in a memory accessible by the plurality of processor cores;

wherein said determining the state of progress of processing the plurality of work items includes accessing the memory.

13. The article of manufacture of claim 9, wherein the program code further comprising code that executes to provide additional method functions comprising:

signaling that a work item of the plurality of work items has been processed.

14. The article of manufacture of claim 9, wherein said determining the state of progress of processing the plurality of work items includes using a plurality of status entries.

15. The article of manufacture of claim 9, wherein said signaling the application that the error has occurred includes returning an error code from the kernel.

16. The article of manufacture of claim 9, wherein the program code further comprising code that executes to provide additional method functions comprising:

after said determining at least one dependency, processing at least one work item of the first plurality of work items that is not included in the at least one dependency.

17. A data processing system, comprising:

a processor;

a memory coupled to the processor;

a first node that includes a plurality of processing cores coupled to the memory; and program code executing on the processor which enables the data processing system to provide a method of operating the data processing system, the method comprising:

processing a first plurality of work items using at least one kernel and using a plurality of processor cores, wherein each of the first plurality of work items is processed by an associated processor core of the plurality of processor cores;

determining that an error occurred during said processing of the first plurality of work items;

signaling an application that the error has occurred;

determining a state of progress of processing the first plurality of work items;

identifying at least one work item that caused the error based on the state of progress;

determining at least one dependent work item of the first plurality of work items that is dependent from the at least one work item that caused the error using the state of progress;

unscheduling the at least one dependent work item;

executing the application using a supervisory processor; and processing the at least one work item that caused the error using the application and the supervisory processor.

18. The data processing system of claim 17, wherein the program code further comprising code that executes to provide additional method functions comprising:

in response to said determining that the error occurred, determining a second plurality of work items scheduled for processing and associated with the error based on the state of progress;

unscheduling the second plurality of work items; and after said unscheduling the second plurality of work items and said processing the at least one work item that caused the error, scheduling the second plurality of work items for processing.

19. The data processing system of claim 17, wherein the program code further comprising code that executes to provide additional method functions comprising:

storing status information in the memory accessible by the plurality of processor cores;

wherein said determining the state of progress of processing the plurality of work items includes accessing the memory.

20. The data processing system of claim 17, wherein the program code further comprising code that executes to provide additional method functions comprising:

signaling that a work item of the plurality of work items has been processed.

21. The data processing system of claim 17, wherein said determining the state of progress of processing the plurality of work items includes using a plurality of status entries.

22. The data processing system of claim 17, wherein said signaling an application that the error has occurred includes returning an error code from the kernel.

23. The data processing system of claim 17, wherein the program code further comprising code that executes to provide additional method functions comprising:

after said determining at least one dependency, processing at least one work item of the first plurality of work items that is not included in the at least one dependency.

* * * * *